March 22, 1955 A. O. WILKENING 2,704,504
SOUND TRAP AND AIR TRANSFER DEVICE
Filed Feb. 2, 1950 2 Sheets-Sheet 1
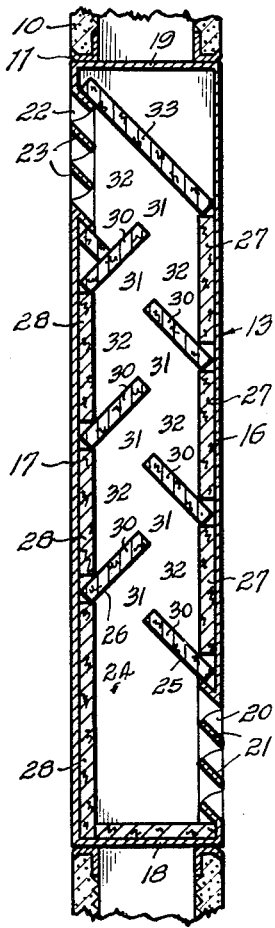
Fig. 1.
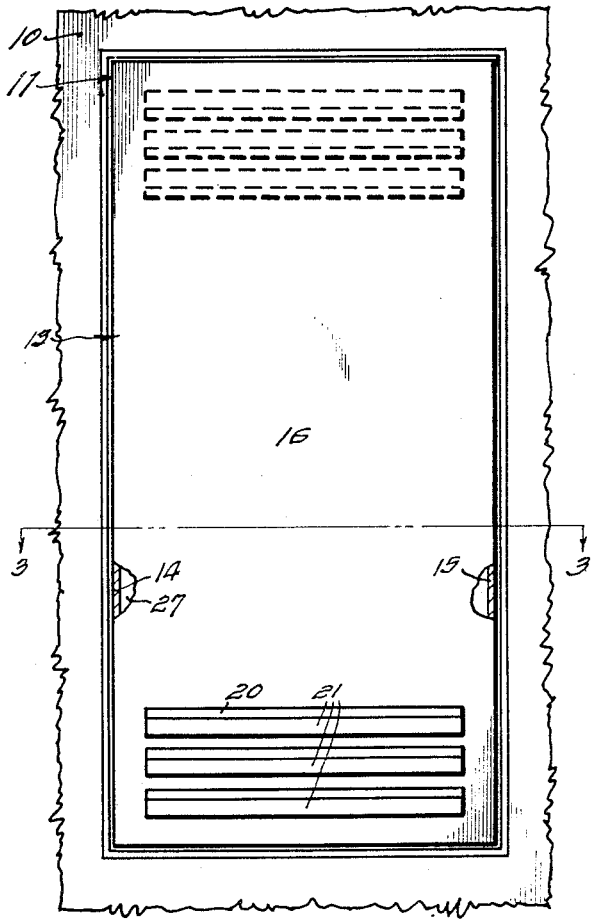
Fig. 2.
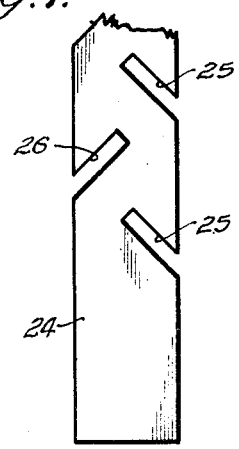
Fig. 4.
Fig. 3.
INVENTOR:
ARTHUR O. WILKENING.
BY
ATTORNEY.

March 22, 1955 A. O. WILKENING 2,704,504
SOUND TRAP AND AIR TRANSFER DEVICE
Filed Feb. 2, 1950 2 Sheets-Sheet 2

INVENTOR.
ARTHUR O. WILKENING
BY
ATTORNEY.

United States Patent Office 2,704,504
Patented Mar. 22, 1955

2,704,504

SOUND TRAP AND AIR TRANSFER DEVICE

Arthur O. Wilkening, St. Louis, Mo.

Application February 2, 1950, Serial No. 141,878

1 Claim. (Cl. 98—87)

My invention relates to a sound trap and air transfer device.

The primary and important object of the invention is to provide a new and novel device for transferring air from one room to another without transmitting airborne noises.

A further object of the invention is to provide a device where air passing through the device may enter from either end thereof, depending on the differential in air pressure at the inlet and outlet ends thereof.

A further object of the invention resides in the provision of a device that is easy to install as a permanent part of an interior wall, ceiling, or interior door, and may be affixed for use in air ducts to reduce sound noise emanating from fans, or blowers.

A still further object of the invention is to provide a device which is simple in construction, low in cost of manufacture and installation, requiring a minimum number of parts and which will be highly efficient for the purpose intended.

Other objects and advantages of the invention will be clearly apparent to those skilled in the art to which the invention relates, during the course of the following description.

In the accompanying drawings, forming a part of this application, and in which like characters of reference are employed to designate like parts throughout the same, Fig. 1 is a vertical sectional view of the sound trap and air transfer device embodying the essential features of the invention.

Fig. 2 is a front elevation of the device.

Fig. 3 is a sectional view taken on line 3—3 of Fig. 2.

Fig. 4 is a fragmentary view of one of the sound absorbing panels, which also serve to support the ends of air deflecting and sound absorbing baffles embodied in the device.

Figure 5:
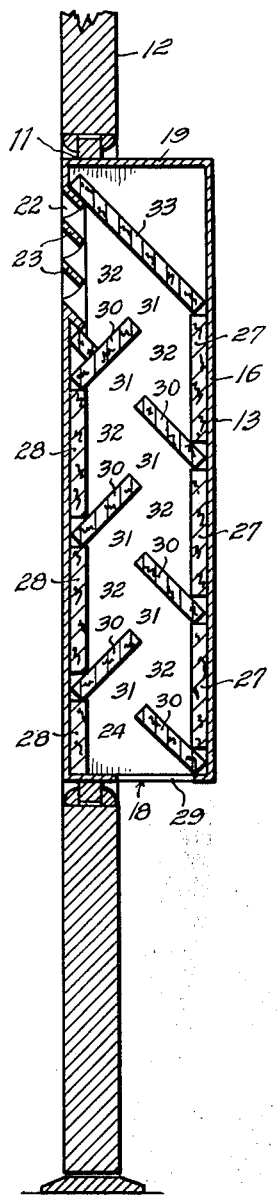
Fig. 5 is a vertical sectional view of a modified form of the invention as applied to a door.
Figure 6:
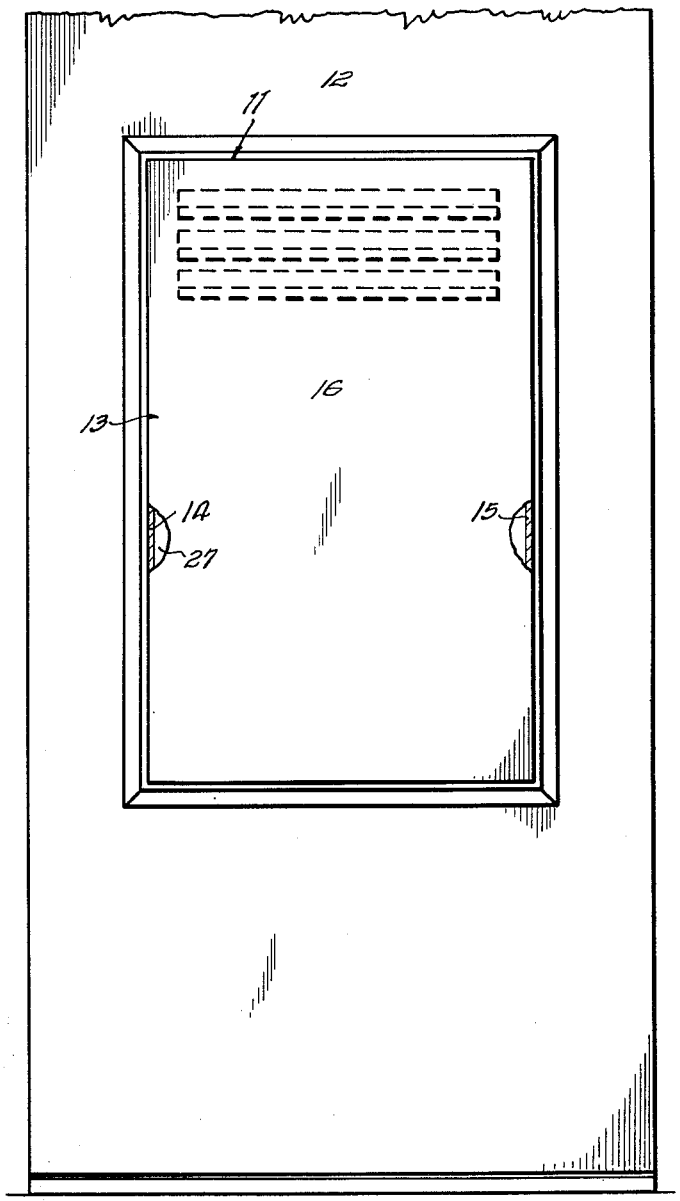
Fig. 6 is a front elevation of the door showing the trap applied thereto.

In the accompanying drawings, for the purpose of illustration, is shown the preferred embodiment of my invention. In Fig. 1, the reference character 10 designates a wall having an opening 11 therein and having the device installed in the opening, and, in Fig. 5, the reference character 12 designates an interior door having an opening 11 in the lower portion thereof and having the device installed in the opening. In Fig. 1, the device is shown as flush with the inside and outside wall surfaces, whereas in Fig. 5, the device is shown as projecting beyond the air inlet side of the door. The device is primarily designed for use in air conditioned office and similar buildings provided with a common air conditioning unit, although it is as highly efficient in transferring air from one room to another in other types of buildings, such as, for instance, a residence, without transmitting air borne sounds, or noises originating in one room to the other. Such results cannot be obtained where a wall, or a door, are equipped with the conventional types of grille.

My device consists of a substantially rectangular box-like case designated, generally, as 13, and includes the side walls 14 and 15, the opposed front and back walls 16 and 17, the bottom wall 18 and the top wall 19. As shown in Fig. 1, the front wall 16 of the case 13 is provided with a suitable air inlet, or opening 20 provided with suitable louvers, or equivalent means 21 at the lower end portion of the wall, and the rear wall 17 of the case is provided with a suitable air outlet, or opening 22 provided with suitable louvers, or equivalent means 23. The case is suitably held in place, and against displacement, in the opening 11 in a wall, door, or ceiling.

The inside faces of the wall of the case 13 are lined, or faced with suitable sound absorbing material.

As clearly shown in Figs. 1 and 3, the side walls of the case are lined on their inner faces with sound absorbing panels 24 having suitable keeper slots 25 and 26 arranged in suitably spaced relation and staggered at a right angle or ninety degrees to each other and open to the front and rear edge portions, respectively, thereof, as clearly apparent in Figs. 1, 4 and 5 of the drawings. As shown in Fig. 1, the front wall of the case is lined upon its inner face with a plurality of spaced suitable sound absorbing members 27 above the air inlet 20. The rear wall of the case is lined upon its inner face with a plurality of spaced suitable sound absorbing members 28 below the air outlet 22. As shown in Fig. 5, the air inlet is arranged in the bottom wall 18 of the case, instead of the front wall 16 of the case, and the air inlet is designated 29. The air inlet 29 is not shown as provided with louvers, but louvers may be provided, if so desired. The sound absorbing members 27 and 28, are shown in Fig. 3 as spanning the full width of the case, with the side sound absorbing panels 24 shown as held between the sound absorbing members 27 and 28 for holding the members 27 and 28 in place.

The reference character 30 designates a plurality of suitable air borne sound absorbing and air deflecting baffles or elements, the ends of which are receivable in the keeper slots 25 and 26, respectively, of the side sound absorbing panels 24 and with their lower edges resting in keeper grooves afforded by the spaces between the sound absorbing lining members 27 and 28, respectively, thus avoiding the use of nails, screws, or similar fastening devices which would tend to transmit sound waves. The upper edges of the baffles are in substantial vertical alignment and spaced from one another, whereby to provide a continuous zig-zag air passage through the casing between the inlet and outlet thereof. The air passage is restricted, as at 31 to provide a throat between adjacent baffles and the area of each throat is less than the total area of the air inlet. Between each set of three baffles, there is formed a right angle triangular pocket or chamber 32 above each baffle, which is of greater area than the throat leading thereto. An additional baffle or member designated 33 is employed and serves as the topmost baffle, which is arranged adjacent the air outlet and serves as a top wall for the air passage.

When a metal case, or enclosure is employed, a heavy sound deadening paint, such as is applied to the underside of the chassis and fenders of automobiles may be applied on the interior of the trap, and the sound absorbing material or members on the sides, front and back walls of the case 13 may be pressed into place while the paint is still in a plastic state.

Operation of the device

Air and noise carried thereby passing through the trap, or case 13 is redirected after striking the preceding baffle. Based on commercially available acoustical duct material which has an absorptive value of approximately 70% air borne sound waves striking the first baffle after passing through the inlet will be reduced approximately 30% of the original intensity. It follows, therefore, that after leaving the second baffle, the sound is reduced to approximately 9%, and successively, as follows: after leaving the third baffle encountered, 27/10 per cent remains; after leaving the fourth baffle, 8/10 of 1% remains; after leaving the fifth baffle ¼ of 1% remains, and, after leaving the sixth baffle designated 34, 7/100 of 1% remains.

The free air area required in the sound trap, or group of sound traps, is governed by the amount of air supplied to the room, minus the amount of air being exhausted by air seeping from the room to the outdoors around window sash, etc.

Although the air will always travel into the room with the negative pressure, sound waves from either side of the trap will be lost inside of the trap.

The many advantages of the herein described invention will readily suggest themselves to those skilled in the art to which the invention relates.

It is to be understood that the form of my invention, herewith shown and described, is to be taken as a preferred example of the same, and that various changes in the shape, size and arrangement of the parts may be resorted to, without departing from the spirit of my invention, or the scope of the appended claim.

What I claim is:

A sound trap and air transfer device especially designed for air circulating purposes through walls and doors between adjoining rooms air conditioned by a common unit, said device comprising a rectangular boxlike casing including a flat front wall having an air borne sound inlet near its lower end, a flat rear wall having an air outlet near its upper end, and a pair of side walls, flat sound absorbing panels provided on the inside of said side walls, flat sound absorbing members arranged in vertically spaced relation on the inside of the front and rear walls and defining sets of horizontally extending front and rear keeper grooves therebetween, the keeper grooves in the front set being vertically offset midway between the keeper grooves in the rear set, said panels being provided with front and rear sets of keeper slots extending upwardly and inwardly from the respective front and rear keeper grooves, the front keeper slots being disposed substantially at right angles to the rear keeper slots, front and rear sets of flat sound absorbing and air deflecting baffles disposed in said casing and having their ends positioned in the respective front and rear keeper slots, the lower edges of said baffles being seated in the keeper grooves of the respective front and rear walls, the upper edges of said baffles being in substantial vertical alignment and spaced from one another whereby to provide a continuous zig-zag air passage through said casing between the inlet and outlet thereof, and an inclined top air borne sound absorbing member resting at its lower edge on the upper edge of the top sound absorbing member on said front wall and having its upper edge resting against said back wall of the casing above said air outlet.

References Cited in the file of this patent

UNITED STATES PATENTS

| Number | Name | Date |
|---|---|---|
| 1,033,963 | Surprise | July 30, 1912 |
| 1,748,863 | Burke | Feb. 25, 1930 |
| 1,756,897 | Bilsky | Apr. 29, 1930 |
| 1,804,070 | Sykes | May 5, 1931 |
| 1,816,769 | Fisk | July 28, 1931 |
| 1,827,996 | Murray | Oct. 20, 1931 |
| 1,964,845 | Dietze et al. | July 3, 1934 |
| 2,051,613 | Macleod | Aug. 18, 1936 |
| 2,161,728 | Stout | June 6, 1939 |
| 2,202,339 | Dresser et al. | May 28, 1940 |
| 2,328,761 | Wamnes et al. | Sept. 7, 1943 |